United States Patent [19]

Bien

[11] Patent Number: 4,973,102
[45] Date of Patent: Nov. 27, 1990

[54] FASTENING ARRANGEMENT FOR PLASTIC TO METAL PARTS

[75] Inventor: Alfred A. Bien, West Bloomfield, Mich.

[73] Assignee: Chrysler Corporation, Highland Park, Mich.

[21] Appl. No.: 437,248

[22] Filed: Nov. 16, 1989

[51] Int. Cl.⁵ .............................................. B62D 24/00
[52] U.S. Cl. .................... 296/187; 296/191; 296/901; 296/198; 411/43; 411/544; 411/368
[58] Field of Search ............... 296/187, 191, 901, 198; 411/43, 338, 339, 368, 369, 544

[56] References Cited

U.S. PATENT DOCUMENTS 4,382,626  5/1983  Spooner ........................... 296/901 X
4,647,264  3/1987  Pamer et al. ......................... 411/338
4,792,475  12/1988  Bien ................................. 411/258 X Primary Examiner—Dennis H. Pedder
Attorney, Agent, or Firm—Edward P. Barthel

[57] ABSTRACT

The present invention relates to an improved arrangement for attaching a plastic panel and metal mounting strip sub-assembly to an automotive body metal substructure enabling controlled distortion free thermal expansion and contraction of the plastic panel relative to the mounting strip. The attaching arrangement comprises a metal spacing washer having a tubular sleeve portion formed with an integral frusto-conical spring flange. The washer sleeve portion free end extends through an elongated slot in the mounting strip and an aligned circular opening in the panel. A blind breakstem rivet is inserted through the washer bore and upon being set applies a predetermined axial clamping force biasing the washer flange into contact with the mounting strip. The rivet head undersurface may be provided with an annular locking ring adapted to engage the plastic panel out surface. Upon the panel being heated to its thermal-relaxation temperature the locking ring is embedded in the softened plastic panel thereby reducing excess load on the washer spring flange in a tolerance self-compensating manner.

3 Claims, 4 Drawing Sheets

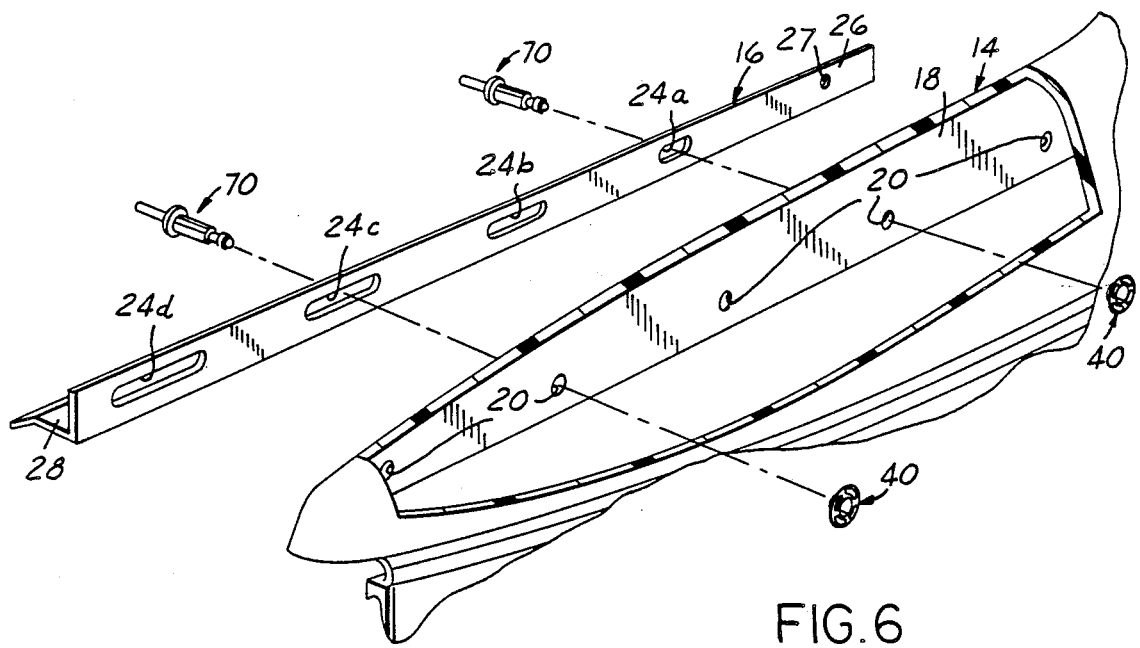
FIG.6
FIG.7 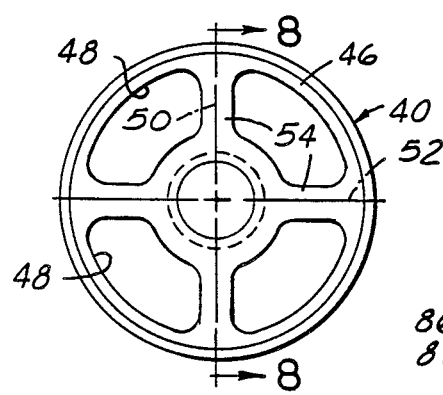 FIG.10 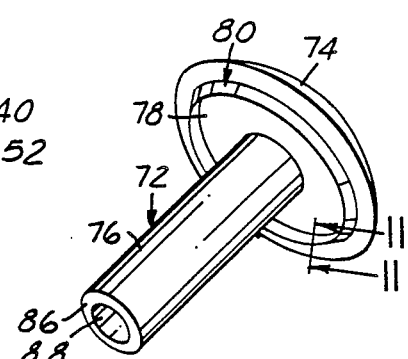
FIG.8
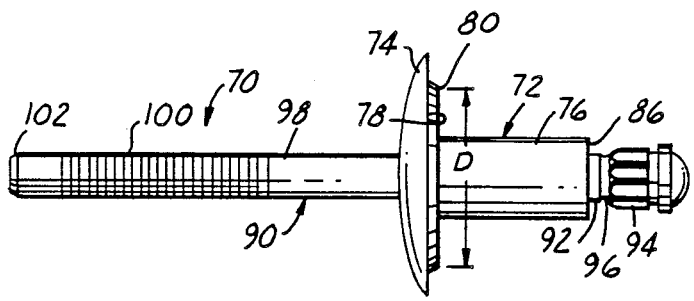
FIG.9

FASTENING ARRANGEMENT FOR PLASTIC TO METAL PARTS

This invention relates generally to a fastening arrangement for securing an elastomeric or plastic panel-like part to a metal substructure portion of an automotive vehicle body and more particularly to such a fastening arrangement which allows for thermal distortion-free movement of the plastic part relative to the substructure.

BACKGROUND OF THE INVENTION

Various arrangements have heretofore been used for securing elastomeric parts to metal portions of motor vehicles. One such arrangement is found in the U.S. Pat. No. 4,792,475 issued Dec. 20, 1988 to Alfred A. Bien entitled Composite Joint Pad For Synthetic Resin Panels. The '475 patent discloses a mounting arrangement and method of manufacture for clamping synthetic resin panels to a workpiece such as a vehicle metal substructure. A composite joint pad has a plate-like metal bushing pre-molded therein. The bushing comprises a raised central embossment having an exposed portion terminating in an arcuate sectioned rim extremity positioned a predetermined distance outwardly from the bonding face of the pad. Upon the bushing exposed embossment being received in a panel aperture, the pad's face is bonded to a panel mating surface with the rim flush with an adjacent surrounding surface of the panel. As a result, the pad's arcuate sectioned rim is clamped to the substructure by means of a threaded fastener being overdriven in the bushing stem without causing stress on the panel.

The U.S. Pat. No. 4,592,937 issued June 3, 1986 to Nagata et al. entitled Arcuate Side Molding discloses an arcuate resin plate side molding of a vehicle adapted to be attached to a curved surface of an automobile metal body avoiding holes being formed therein. The thermal expansion coefficient of the side molding is different from that of the automobile body. Therefore, the direct attachment of the molding to the metal body results in thermal deformation of the molding relative to the body, for example, in a hot day in summer. In the Nagata et al. patent the molding comprises a resin plate having projections formed in the backside thereof, and an intermediate member provided with slots for receiving the projections of the resin plate. In assembling the resin plate and the intermediate member, the projections are inserted through the slots of the intermediate member, and then the tips of the projections are heat caulked to join the intermediate member to the resin plate. In this way the resin plate and the intermediate member are longitudinally slidable relative to each other.

The U.S. Pat. No. 4,597,153 issued July 1, 1986 and U.S. Pat. No. 4,529,244 issued July 16, 1985 to common inventor W. S. Zaydel disclose a method for mounting a plastic body panel on a vehicle underlying metal substructure together with the mounting structure therefore. The Zaydel patents disclose a fastener fixedly attaching one end portion of the plastic panel on the metal structure. A mounting block is slidably mounted on the metal substructure longitudinally spaced from the fastener to define a path of longitudinal movement of the mounting block toward and away from the fixed end portion of the plastic panel. A spring urges the mounting block to a certain longitudinal position and is yieldable to permit movement of the mounting block away from the certain longitudinal position. A fastener attaches the plastic panel to the mounting block so that the plastic panel is effectively supported in a manner enabling longitudinal movement relative to the fixed one end portion to accommodate thermal or hygroscopic growth of the plastic panel.

The U.S. Pat. No. 3,875,661 issued Apr. 8, 1975 to Lindstrom et al. discloses a flexible subassembly for installation on a vehicle body. The Lindstrom subassembly includes a flexible elastomeric panel having a peripheral contour corresponding to a similar peripheral contour on the body, a plurality of square bosses on a mounting surface of the flexible panel, a rigid reinforcing panel disposed in juxtaposition with the mounting surface, and a plurality of apertures in the reinforcing panel corresponding to the bosses. Each aperture is larger than the corresponding boss in a direction parallel to the peripheral contour so that thermal expansion and contraction of the flexible panel is directed along the peripheral contour thereby to assure a continuous contour across the interface between the flexible panel and the body.

Referring now to the drawings, FIG. 1 depicts a fragmentary vehicle body frame 10 showing a prior art arrangement for mounting a metal fender 12' on a substructure frame portion 14'. The fender 12' is formed with an integral inwardly extending mounting flange 16', having a plurality of attachment holes 18' therein. The fender 12' is adapted for locating on the substructure portion 14' with the holes 18' aligned with attaching holes 20' in the substructure portion 14' for reception of suitable threaded fasteners 22'. Various other fasteners 24' and clips 26' are shown for use in securing other portions of the fender 12' to the vehicle substructure frame 10.

An example of one prior art fastening arrangement for securing a plastic panel member to a metal substructure is shown in FIGS. 14 and 15 of the drawings. FIG. 15 discloses a plastic panel "a" mounted on a metal substructure such as sheet metal flange "b" by a fastening arrangement generally indicated at "c". It will be seen in FIG. 14 that the plastic panel "a" has an elongated slot "d" formed therein adapted for alignment with a circular opening "e" provided in the flange "-b". The fastening arrangement "c" comprises a threaded self-tapping or self-drilling screw including a threaded stem "f" having an enlarged shoulder portion "g" sized for guided longitudinal travel in the slot "d". A resilient spring washer "h" includes a ring portion "i" in flush contact with the outer surface of the plastic panel "a" and a plurality of radial spring tabs angled axially away from the plane of the ring portion "j" with their free ends engaging the underside of head "k" of the screw. The spring washer "h" provides an axial clamping force to maintain the plastic panel "a" in flush contact with the metal flange "b" while the slot "d" allows the plastic panel to slide relative to the flange to accommodate thermal growth of the plastic panel.

One disadvantage of the prior art mounting structure shown in FIGS. 14 and 15 concerns scraping or marking of the exposed surface "1" of the plastic panel by the ring portion "i" of the spring washer "h" as the plastic panel "a" moves relative to the fixed screw and washer. Such marking or scratching of the surface "1" is particularly undesirable in the automotive industry where the panel "a" is an fender, for example, and the surface "1" is a painted area exposed to view. Such a mounting structure results in the painted surface "1" being marred and damaged by the ring "i" during movement of the plastic panel. Another disadvantage of the prior art mounting structure of FIGS. 14 and 15 is the variable clamping force applied by the self-drilling screw may result in an excessive force restricting the sliding movement of the plastic panel "a" relative to the metal flange "b".

SUMMARY OF THE INVENTION

A primary object of the present invention is to provide an attaching arrangement for securing a plastic panel to a metal substructure of an automobile body in a manner capable of allowing the plastic panel to slide relative to the metal substructure because of the different thermal expansion characteristics between the panel and the substructure.

It is still another object of the present invention to provide an attaching arrangement as set forth above wherein a blind type rivet is used in combination with a novel tubular spacing washer, formed with a frusto-conical sectioned spring flange, whereby a predetermined axial clamping force is applied between the substructure and the plastic panel, upon setting the rivet, enabling controlled spring biased sliding movement of the panel, the blind rivet, and the washer relative to its associated slotted opening in the substructure.

A still further object of the present invention is to provide an attaching arrangement as set forth above wherein the underside of the rivet head has an annular thread-shaped locking ring which allows for tolerance compensation in that, subsequent to the rivet being set, the ring embeds itself into the plastic panel upon the plastic panel being heated to its predetermined thermal relaxation softening temperature with a resultant reduction of any excess clamping load applied by the rivet in a self-compensating manner.

It is a further object of the present invention to provide a novel mounting arrangement as set forth above including a method for attaching a plastic panel and metal mounting strip sub-assembly to a vehicle body metal substructure during an assembly line operation. After the plastic panel and metal mounting strip sub-assembly have been attached to the substructure the body a corrosion-protection operation occurs wherein one or more undercoats of paint primer are applied to continuously advancing vehicle bodies on an assembly line. Upon the vehicle bodies receiving the coats of paint primer they are advanced to a heating and curing oven and heated to a predetermined undercoat curing temperature in the range of 250 to 350 degrees F. By virtue of the plastic panel being subjected to its thermal-relaxation elevated temperature possible excess clamping force of the blind rivet on the washer spring flange, caused by a manufacturing tolerance stack-up, dimensional variation in the plastic panel, etc. may interfere with the free sliding movement of a panel. The present attaching arrangement automatically relieves any excess clamping force by means of an annular axially extending thread-shaped locking ring being provided on the rivet head undersurface. The thread-shaped locking ring is adapted to penetrate the heat softened plastic or thermal relaxed panel during the heat curing cycle. A self-compensating arrangement is provided for reducing the blind rivet tension on the washer spring flange and insuring heat induced sliding movement of the plastic panel relative to the metal substructure.

The invention provides an attaching arrangement and method for mounting a plastic panel and metal mounting strip sub-assembly upon an underlying metal substructure of a vehicle body. A plurality of circular openings are provided in the plastic panel, each aligned with an associated aperture in the mounting strip. A circular aperture is formed adjacent one end of the metal mounting strip sized to snugly receive therethrough the lead-in end of a tubular sleeve portion of a metal washer. The lead-in end of the washer sleeve portion is snugly received in an aligned circular opening in the plastic panel. The remaining apertures in the mounting strip are in the form of elongated slots with each slot aligned with an associated circular opening in the plastic panel. The slots may progressively increase in length as their location from the circular opening becomes greater to account for greater thermal expansion of the panel.

The washer tubular sleeve opposite end is formed with an integral frusto-conical spring flange extending radially outwardly therefrom. A blind break-stem rivet is provided for each washer having an elongated tubular body formed with a rivet head at one end of an integral elongated shank. The washer sleeve defines a through bore receiving the rivet shank therethrough such that with the plastic panel and metal mounting strip in flush relation the rivet head undersurface contacts the panel outer surface while the washer spring flange periphery contacts the mounting strip outer surface.

Upon the blind rivet being set a predetermined rivet tension or axial gripping force is applied to the washer and biasing the spring flange into contact with the substructure. Thus, during periods of thermal expansion and contraction the invention allows the plastic panel together with each attachment washer and its respective gripping blind rivet extending through an associated elongated slot in the substructure to slide relative thereto obviating distortion of the plastic panel.

These and other objects and features of the invention will become apparent to those skilled in the fastening arts upon reading the following detailed description with reference to the accompanying drawings in which:

BRIEF DESCRIPTION OF THE DRAWINGS

FIG. 6 is a fragmentary exploded perspective view showing the elastomeric fender and mounting angle bar prior to be attached into a sub-assembly;

FIG. 7 is an enlarged detail end elevational view of the spring washer used in the attaching arrangement of the present invention;

FIG. 8 is a vertical sectional view taken on the line 8—8 of FIG. 7;

FIG. 9 is an enlarged side elevational view of the blind break-stem rivet used in the attaching arrangement of the present invention;

FIG. 10 is a detail perspective view of the head portion of the rivet shown in FIG. 9;

DESCRIPTION OF THE PREFERRED EMBODIMENT

Figure 1:
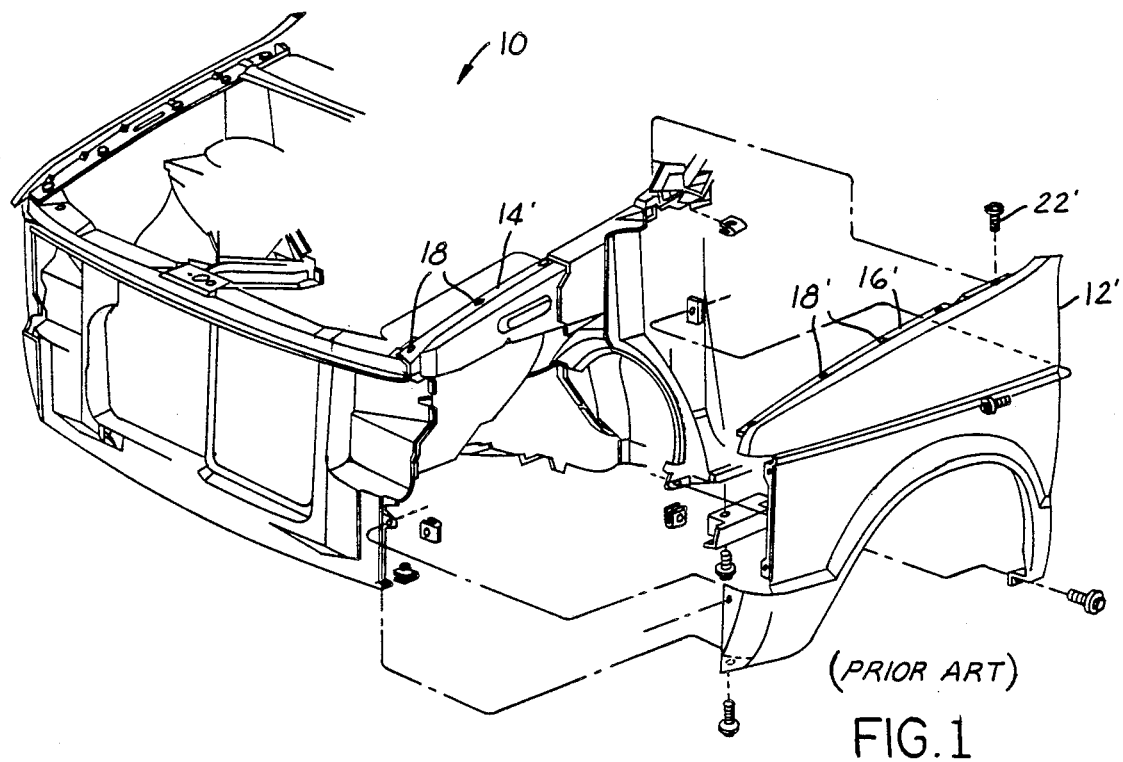
FIG. 1 is a fragmentary exploded perspective view of a prior art vehicle frame structure showing an arrangement for mounting a front metal fender thereto.
Figure 2:
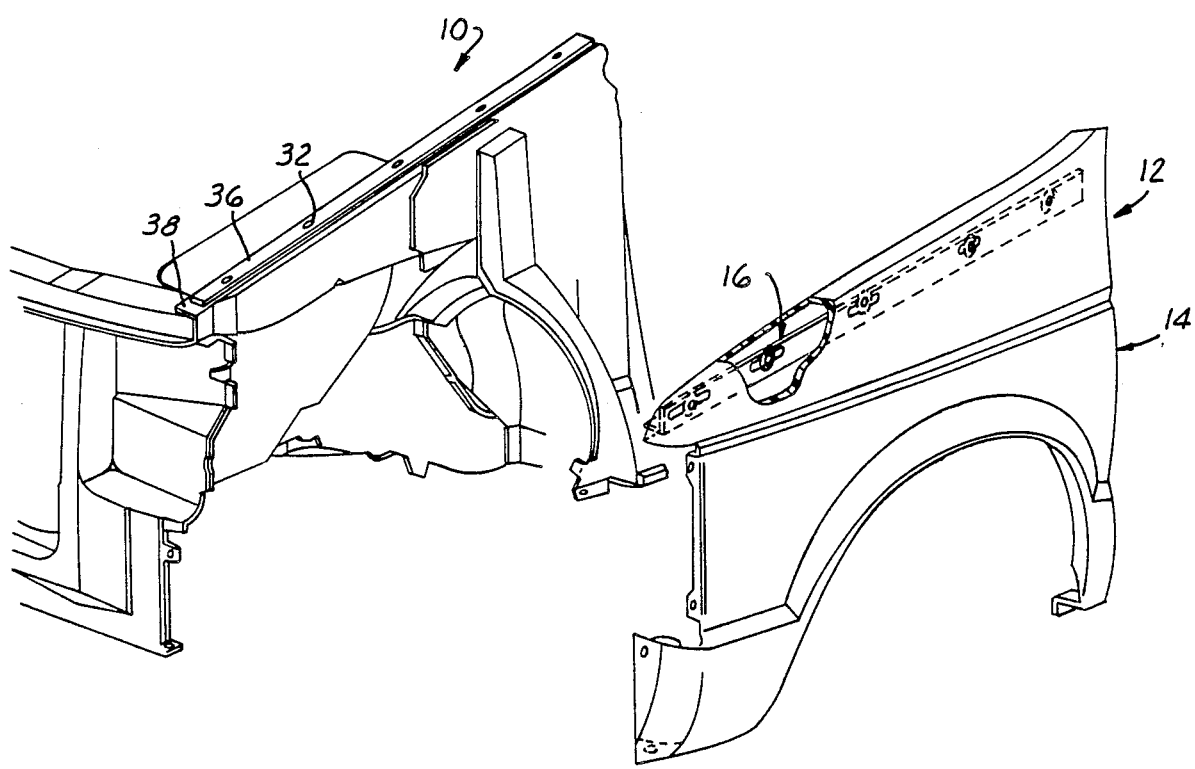
FIG. 2 is a fragmentary exploded perspective view of a vehicle frame structure showing a improved arrangement for mounting a front elastomeric fender on the metal frame.
Figure 3:
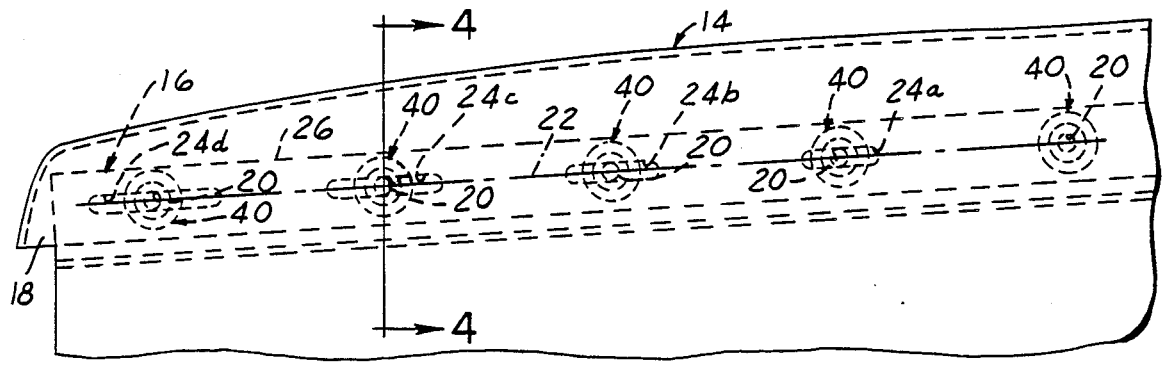
FIG. 3 is an enlarged fragmentary side elevational view of the elastomeric fender fixedly mounted on the vehicle body frame.
Figure 4:
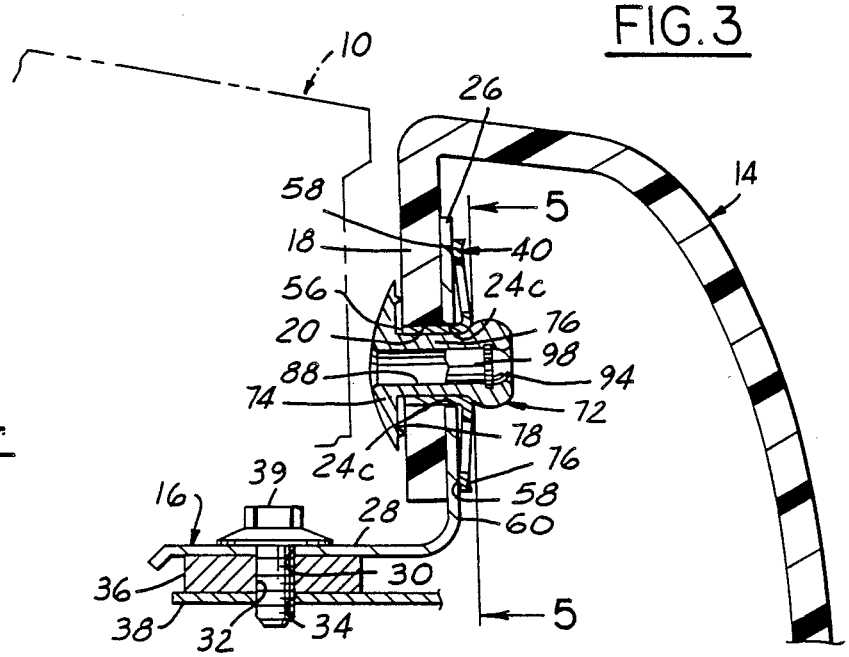
FIG. 4 is a fragmentary vertical sectional view taken substantially on the line 4—4 of FIG. 3.
Figure 5:
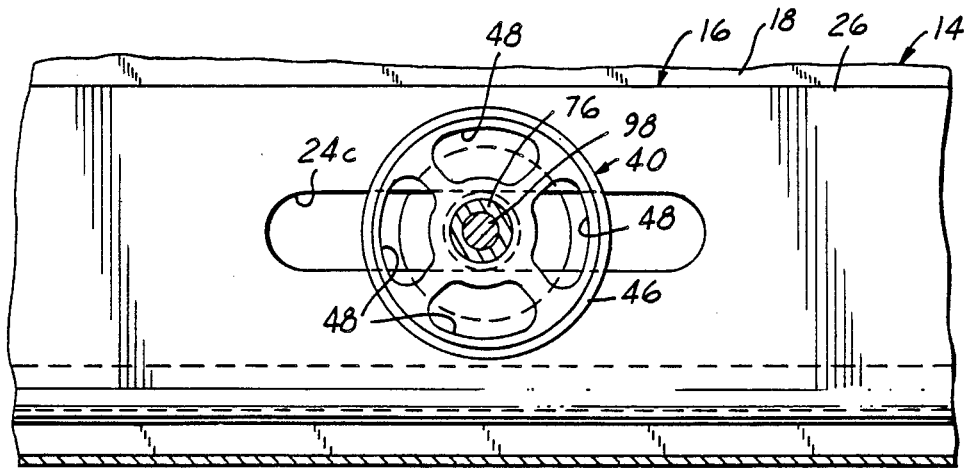
FIG. 5 is an enlarged fragmentary vertical sectional view taken substantially on the line 5—5 of FIG. 4.
Figure 11:
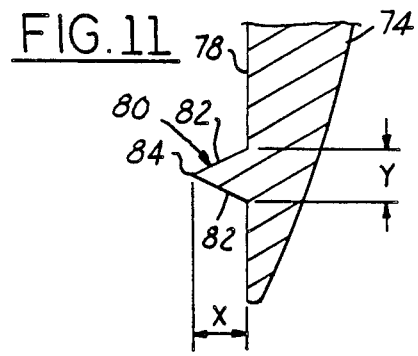
FIG. 11 is an enlarged fragmentary cross sectional view taken on the line 11—11 of FIG. 10.

Turning now to the present invention, FIG. 2 shows a front portion of a vehicle body frame 10 adapted to receive a plastic panel member which in the disclosed embodiment is a front fender sub-assembly, generally indicated at 12. The fender sub-assembly 12 comprises a molded plastic fender 14, formed from a suitable elastomeric material, and an elongated metal mounting strip. In the disclosed embodiment the metal mounting strip is in the form of an L-sectioned metal angle 16 secured to the plastic fender by applicant's improved fastening arrangement. As best seen in FIGS. 3 and 4, the plastic fender 14 is formed with an integral planar attachment plastic panel 18 having a plurality of spaced uniform circular openings 20 aligned on a common axis 22. In the instant embodiment five circular openings 20 are shown with the forward four openings adapted for alignment with an associated one of four slotted or elongated apertures 24a, 24b, 24c, and 24d formed in upright flange 26 of the metal angle 16. In the disclosed form of the invention the elongated apertures 24a–24d are sized so as to progressively increase in length from the initial shortest slotted aperture 24a to the final longest slotted aperture 24d. It will be noted in FIG. 3 that the right-most flange circular opening 20 is aligned with a circular reference hole 27 (FIG. 6) in the flange 26 with the hole 27 having a diameter equal to the diameter of the fender circular openings 20 for a reason to be explained below.

As viewed in FIG. 4 it will be seen that the metal angle 16 has a generally horizontally extending flange 28 formed with a plurality of apertures 30. In the instant embodiment the apertures 30 are adapted for alignment with internally threaded bores 32 and 34 in underlying support members 36 and 38 respectively, of the vehicle frame member 10. In this manner the sub-assembly metal angle 16 is adapted to be secured to the vehicle substructure such as frame members 36 and 38 by suitable threaded bolts 39, for example, such that the angle 16 becomes a part of the vehicle substructure.

A plastic panel, such as the plastic fender 14, is made of urethane resin elastomeric material or the like which has a thermal expansion rate substantially different from the metal angle 16. Thus, a fastening arrangement is required that can be readily attached to a vehicle substructure while allowing distortion free thermal growth of the plastic panel portion 18.

With reference to FIGS. 3 and 4 a fastening arrangement comprises a spacing washer, generally indicated at 40, including a tubular sleeve portion 42 defining an axial through bore 44 of predetermined axial extent. As best seen in FIG. 8 the washer 40 is formed with an integral frusto-conical spring disk 46 extending radially outwardly at one end of the sleeve portion 42. It will be noted in FIG. 7 that the spring disk 46 has a plurality of openings 48 cut therein symmetrical about vertical 50 and horizontal 52 axes. In the disclosed form their are four openings 48 defining four spokes 54 spaced at 90 degree angles.

As seen in FIG. 4, the washer sleeve portion free end 56 extends through an associated slot, such as 20a for example, in the metal flange 26 and thence through aligned circular opening 20 in plastic panel 18 of the fender 14. The sleeve portion 42 has a predetermined axial extent such that with peripheral portion 58 contacting outer face 60 of the metal upstanding flange 26 the sleeve portion free end 56 is substantially flush with outer surface of the plastic panel 18.

A blind break-stem rivet, generally indicated at 70 in FIG. 9, comprises an elongated tubular rivet body 72 formed with a rivet head 74 at one end of integral shank 76 of the rivet body 72. As best seen in FIG. 10 the rivet head 74 has a planar undersurface 78 formed with a tolerance compensating thread-like ring 80 of a predetermined diameter "D". It will be noted in FIG. 10 that the thread-like ring 80, concentrically disposed about the shank principal axis, is formed with a pair of sloped flanks 82 terminating in a pointed crest 84. In the predetermined embodiment the thread-like ring 80 has a base dimension "Y" of the order of 0.025 mm and extends a predetermined axial dimension "X" of the order of 0.015 mm toward shank free end 86. The rivet body shank 76 has an axial bore 88 throughout the rivet head 74 and shank 76 with the bore 88 sized for the reception of a mandrel 90 of the break-stem type.

The U.S. Pat. No. 4,355,934 issued Oct. 26, 1982 to Denham et al. discloses an example of a typical self-plugging blind rivet the disclosure of which is incorporated by reference herein. As explained in the Denham patent the mandrel 90, shown in FIGS. 8 and 12, comprises an elongated stem 92, a plug 94, and a breaker groove 96 which demarcates the stem from the plug leaving a breakneck which is the weakest portion of the mandrel so that, when the mandrel is subjected to tension, it will break at the breaker groove rather than elsewhere. The stem 92 of the mandrel is appreciably longer than the rivet body 72 and has a plain cylindrical portion 98 immediately adjacent to the breaker groove, a grooved portion 100 formed with a plurality of pulling grooves, and a terminal tapered lead-in 102 at the end remote from the plug 94. The pulling grooves 100 allow the stem to be gripped firmly and pulled by means of a suitable riveting setting tool (not shown).

Figure 13:
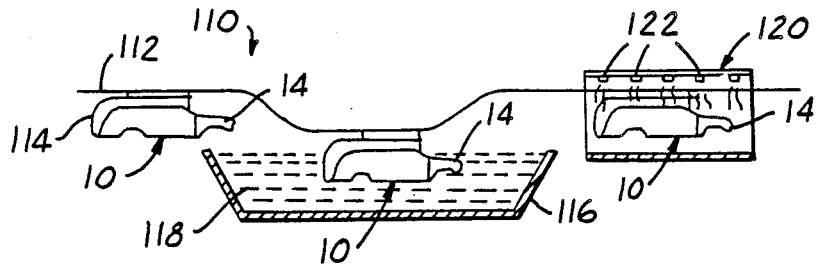
FIG. 13 is a schematic view, partially in section, of a portion of a vehicle body assembly line wherein primer paint applying and heat-drying cycles are shown.

The fender sub-assembly 14 is mounted on the vehicle body substructure 36, as seen in FIG. 4, by the bolts 39 prior to the vehicle being advanced along an assembly line generally indicated at 110 in FIG. 13. The line 110 schematically represents a corrosion-protection finishing operation wherein one or more under-coats of paint primer, for example, are applied to continuously advancing vehicle bodies 10 shown suspended from an overhead conveyor track 112. The bodies 10, which are suspended from the track by carriers 114, are seen having fender sub-assemblies 14 attached thereto in a manner shown in FIG. 4 prior to the vehicle body being submerged in a vat or tank 116 filled with a suitable protective undercoating such as a paint primer 118. A paint heating and curing oven 120 includes a plurality of radiant heating fixtures 122 arranged to bake the paint to a suitable temperature, in the range of 250 degrees F. to 350 degrees F. thereby bonding the paint to the exposed surfaces of the metal body portions.

Figure 12A:
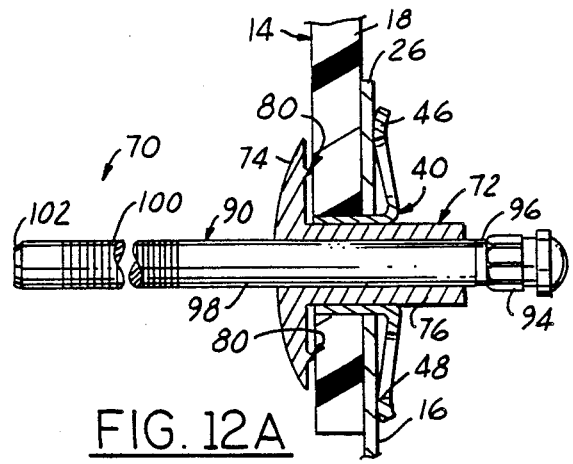
FIG. 12A is a longitudinal sectional view, partly in elevation, of the attaching arrangement of the present invention prior to setting the rivet.

As seen in FIG. 12 prior to the break-stem blind rivet 70 being set the annular thread portion 80 on the underside of the rivet head is shown with its crest 84 contacting the outer surface of the plastic panel 18. Upon the rivet 70 being set the crest 84 just slightly penetrates the plastic panel outer surface as seen in FIG. 4. Depending upon production tolerances the plastic panel 18 thickness will vary over a predetermined range of thicknesses. It will be appreciated that if the plastic panel 18 is formed with its maximum allowable tolerance thickness the blind rivet 70 will exert a greater axial spring bias load on the spacing washer spring disc 46 than a panel 18 formed at its design or minimal allowable tolerance thickness. Such over-designed axial spring bias loads will increase the pressure of the metal flange 26 against the inner surface of the plastic fender attachment panel 18 unduly restricting the panel's movement relative to the metal flange 26 during periods of thermal expansion of the plastic panel.

Applicant's novel method of installing the fastening arrangement may include a step involving a vehicle body assembly line operation as, discussed in the U.S. Pat. No. 4,657,460. The step is made possible because the assembly line includes as a final down-stream process the passage of the vehicle body through the paint heating and curing oven 120 after the plastic fender 14 has been installed on the body 10 upstream of the tank 116.

Figures 12B, 12C:
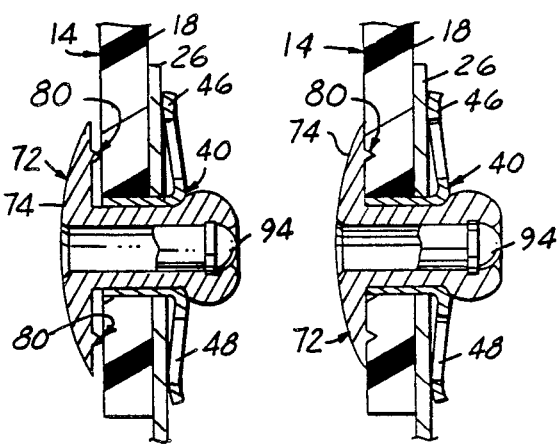
FIG. 12B is a view similar to FIG. 12A showing the attaching arrangement after setting of the rivet.
FIG. 12C is a view similar to FIG. 12C showing the attaching arrangement upon the temperature of the plastic panel being elevated to its thermal relaxation point.
Figure 14:
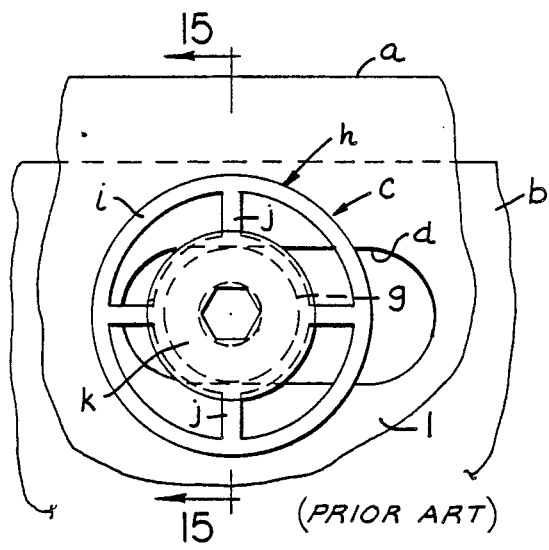
FIG. 14 is a fragmentary side elevational view of a prior art arrangement for mounting an elastomeric part, such as a plastic panel fender, on a vehicle metal substructure.
Figure 15:
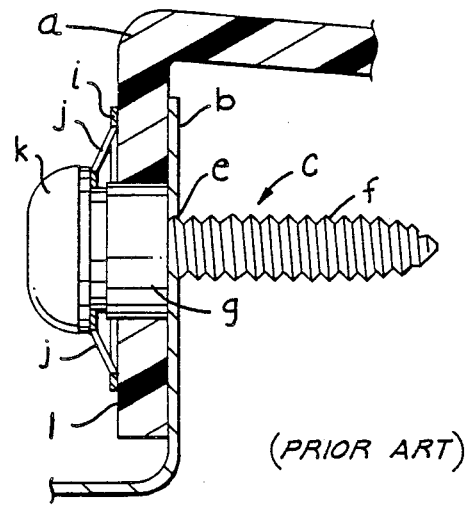
FIG. 15 is a fragmentary vertical cross sectional view taken substantially on the line 15—15 of prior art FIG. 14.

The fastening arrangement of the present invention is designed such that during the advancement of the vehicle body 10 through the heat curing oven 120 the thread-like rings 80 will penetrate the plastic panel 14. Thus, FIG. 12B shows applicant's fastening arrangement prior to passage through the heating oven 120 wherein the spring disk 46 is in an over compressed state due to a tolerance build-up caused, for example, by the plastic panel 18 having a thickness in excess of its designed criteria. FIG. 12C is a view of the fastening arrangement of 12B upon exiting the heating oven 120 wherein the elevated oven temperatures in the range of 250 degrees to 350 degrees F. cause the thread-like rings 80 to each penetrate the thermal relaxed plastic and relieve the spring clamping force in a tolerance self-compensating manner.

As the fender panel portion 18 is anchored at its rearmost end by a rivet head 72 set in metal flange reference hole 27 and its aligned rearmost panel hole 20 of matching diameter, the fender is free to expand in a forward direction from the rivet head fixed in reference hole 27. Thus, the four slots 24a, 24v, 24c and 24d accommodate thermal expansion of the fender 14 in the forward longitudinal direction relative to the metal angle substructure 16 as taught, for example, in the U.S. Pat. No. 4,564,232 issued Jan. 14, 1986 to Fujimori, et al.

While a preferred embodiment has been shown and described to illustrate the invention, other embodiments will become to those skilled in the art. Accordingly, the scope of his invention is set forth in the following claims.

What is claimed is:

1. In an automobile vehicle body having a metal substructure, a one-piece plastic panel having an integral planar flange having outer and inner planar surfaces, said flange having its inner surface in flush contact with an inner planar surface of said substructure with the plastic flange having different thermal expansion characteristics than the metal substructure, and fastening means for securing the plastic panel flange to the substructure comprising:

a fastening arrangement including a spring washer having a tubular sleeve portion defining an axial through bore of predetermined axial extent and an integral frusto-conical spring flange extending radially outwardly at one end thereof, said sleeve portion other end extending through an elongated slot in said substructure and a circular hole of predetermined diameter in said plastic flange;

said washer tubular sleeve portion having a predetermined axial extent such that with the periphery of said washer spring flange contacting the outer planar surface of said substructure and with said tubular sleeve portion other end substantially flush with the outer surface of said plastic flange;

a blind break-stem rivet comprising an elongated tubular rivet body having a head at one end and an integral elongate shank, said shank being adapted upon setting of said rivet to expand radially to form a blind end, an axial bore extending throughout said head and said shank, and a mandrel disposed in said axial bore, said mandrel having an elongate stem which projects from the head end of said axial bore, a plug, and a breakneck portion joining said stem and said plug;

said washer through bore having a predetermined diameter telescopically receiving said rivet elongated shank therethrough such that the undersurface of said head contacts the outer surface of said plastic flange;

whereby upon said rivet being set causing radial expansion of the shank to form a blind head when the mandrel is pulled to move the plug relatively towards the head end of said body, wherein a predetermined axial clamping force is applied to said washer causing said washer radial spring flange to resiliently bias said head undersurface into contact with said plastic flange outer surface providing heat induced sliding movement of said plastic panel relative to said metal substructure.

2. In an automobile vehicle body having a metal substructure, a plastic panel for attachment to said substructure, fastening means fixedly attaching the panel to said substructure such that said plastic panel is slidable relative to said substructure, the improvement in said fastening means wherein:

said plastic panel having inner and outer planar surfaces, at least one hole of predetermined diameter formed in said panel;

said metal substructure having a planer portion defining inner and outer planer faces, said plastic panel inner surface in flush contact with said substructure planer portion inner face such that said one hole is aligned with an elongated slot in said substructure;

a spring washer including a tubular sleeve portion defining an axial through bore of predetermined axial extent, an integral frusto-conical spring flange extending radially outwardly at one end of said sleeve portion, said sleeve portion other end extending through said substructure elongated slot and said plastic panel hole, said sleeve portion having a predetermined axial extent such that with the peripheral edge of said washer spring flange contacting said substructure outer face said washer sleeve portion other end is substantially flush with said plastic panel outer surface;

a blind break-stem rivet having an elongated tubular rivet body formed with a rivet head at one end and an integral elongate shank, said rivet head having its undersurface formed with a thread-like concentric ring of a predetermined diameter terminating in an annular sharp crest extending a predetermined axial distance towards said shank;

said rivet body shank being adapted to expand radially to form a blind end, an axial bore throughout said rivet head and shank, and a mandrel disposed in said body bore, said mandrel having an elongate stem which projects from the rivet head end of said body bore, a plug, and a breakneck joining said stem and said plug;

said washer through bore having a predetermined diameter telescopically receiving said rivet elongated shank therethrough such that said rivet head undersurface annular sharp crest initially contacts said plastic panel outer surface in a line contact manner;

whereby upon said rivet being set causing radial expansion of said shank to form a blind head when said mandrel is pulled to move said plug relatively towards said rivet head end of said body, wherein an axial clamping action is applied to said washer causing said washer radial spring flange to bias said rivet head annular sharp crest into pressure contact against said plastic panel outer surface; and wherein upon said attached plastic panel being heated to its thermal-relaxation temperature said plastic panel softens such that said annular sharp crest penetrates said plastic panel outer surface to a depth sufficient to relieve excess preloading of said spring flange providing a controlled sliding resistance of said washer spring flange with said metal substructure such that said plastic panel is slidable relative to said substructure upon thermal growth of said plastic panel.

3. The improved fastening means as set forth in claim 2 wherein said thermal relaxation temperature is in the range of 250° F. to 350° F.

* * * * *